July 19, 1966 G. A. HOOD ET AL 3,261,415
DRY SOLIDS FEEDER
Filed April 2, 1964 4 Sheets-Sheet 1

INVENTORS
JOHN J. VROLYK
GEORGE A. HOOD
BY
*Stuart W. Wohlgemuth*
ATTORNEY

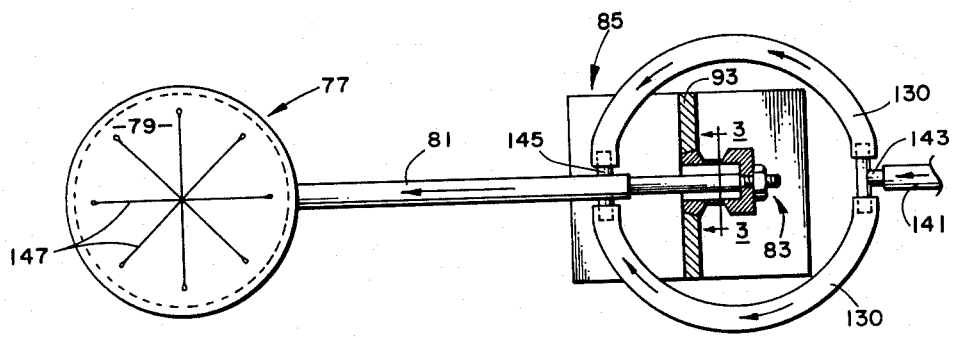
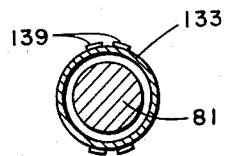
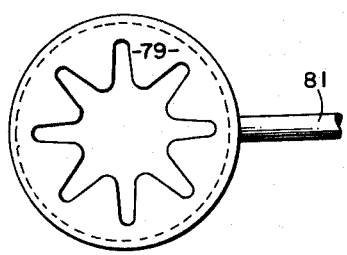
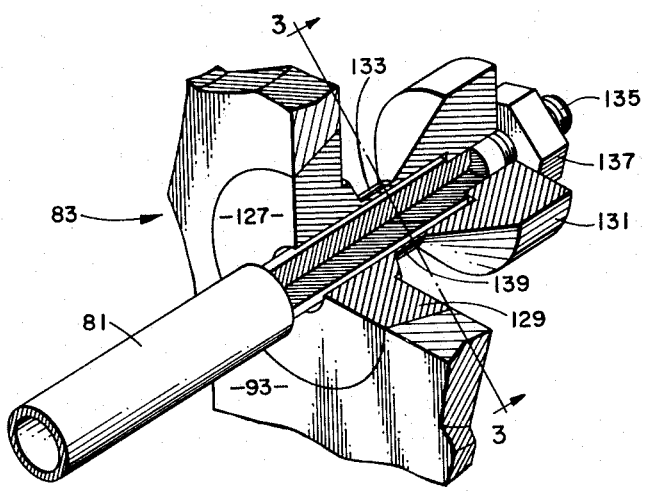

INVENTORS
JOHN J. VROLYK
GEORGE A. HOOD
BY
ATTORNEY

July 19, 1966 G. A. HOOD ETAL 3,261,415
DRY SOLIDS FEEDER
Filed April 2, 1964 4 Sheets-Sheet 4

INVENTORS
JOHN J. VROLYK
BY GEORGE A. HOOD
ATTORNEY

United States Patent Office 3,261,415
Patented July 19, 1966

3,261,415
DRY SOLIDS FEEDER
George A. Hood, Van Nuys, and John J. Vrolyk, Granada Hills, Calif., assignors to North American Aviation, Inc.
Filed Apr. 2, 1964, Ser. No. 356,889
3 Claims. (Cl. 177—68)

This invention relates to a device for feeding solid materials. More particularly, the invention relates to a device for feeding solid materials in a continuous process at a given weight for a fixed time interval.

In United States Patent No. 3,022,149 of February 20, 1962, to F. B. Cramer, a process is disclosed for dispersing solids in polymeric propellant fuel binders. The patent describes a process for the manufacture of a composition comprising uniformly dispersed solid particulate substance in organic polymer. The referred-to patent describes the mixing under turbulent conditions of at least one liquid organic material which serves as a binder or matrix upon curing with at least one solid particulate filling substance. The mixing is carried out in the presence of an inert nonsolvent liquid carrier. The turbulent conditions serve to combine the filling substance and liquid organic polymeric material into a dispersion on contact such that the dispersion, upon release of the turbulent conditions, separates from the liquid carrier. Upon curing, the dispersion forms a solid cohesive substance of substantially uniform composition.

Copending application, Serial No. 312,962, filed October 1, 1963, discloses a system for utilization in the process of Patent No. 3,022,149 for dispersing the solid constituents in the inert liquid carrier. The system for dispersing the solids material generally comprises a hopper to which is fed the solid constituents and the inert liquid carrier. The output of the hopper is directed to a pump whereby a portion of the mixed materials are then recirculated back to the hopper with the remaining amount going into the continuous process. The recycled slurry serves to agitate and disperse the incoming material in the hopper. The level of material in the hopper is maintained at a constant by a level controller which regulates only the incoming inert carrier line. The solid material is fed into the hopper at a fixed continuous rate which does not vary. The herein invention relates to a solids feeder for utilization with this dispersion system as well as other processes. This feeder thus will feed the solid material into the dispersion system of the copending referred-to patent application.

The pertinent requirements for a solids feeder to be utilized in the particular process intended was that it have safety, reliability, and versatility. Additionally, an accuracy and precision of ±0.1% of set point was required. No solids feeders were available that had the foregoing requirements.

The basis of the operation of the solids feeder is that a given weight of material must be fed in a given time interval. Prior to the herein invention, in most feeder systems to date the time interval is fixed and quantity of material delivered is varied to give correct weight in such a time interval. The problem with these prior devices is that it is very difficult, and in fact impossible, to get solids to flow at the rate one desires since solids are not fluid enough so as to accomplish this. Examples of such prior devices include both a conventional screw type feeder and a hopper having a drum on the bottom thereof with vanes attached to the drum. The vanes carry the solid material from the hopper into the process. The speed of the drum will determine the amount of material being fed from the hopper just as the speed of the screw determines the amount of solids being fed. In addition to the above-mentioned problem relative to the precise control solids, none of the prior devices are capable of correcting any deviation from the desired flow rate. If too much solids is being fed, the systems do not have means for correcting such an imbalance. As previously mentioned, one of the purposes of the feeder of this invention is to have a precision of ±0.1% of the set point. Such a precision is not available in the prior art devices because of the absence of means for correcting errors. A further problem of dry solids feeders is that they are suitable for feeding energetic particles such as those used in solid propellant applications. In most of the prior devices friction is often generated through contact of metal parts. This would be prohibitive to the feeding of energetic particles.

Thus, an object of this invention is to provide a solids feeder that is safe for handling highly hazardous material.

Another object of this invention is to provide a solids feeder having accuracy of precision ±0.1% of the set point.

Still another object of the invention is to provide a solids feeder that will deliver a given weight of material per unit interval of time.

The above and other objects of the invention are accomplished by a device of this invention wherein solids are first supplied to a feed hopper. An increment of the solids flows through a feed valve located at the bottom of the hopper each time the valve is opened. The solids flow through the feed valve into a weigh hopper having a valve located at the bottom thereof. The weigh hopper is connected to a weigh transducer so that the increment of material can be weighed. A resulting signal whose voltage is proportional to the amount of material comes from the transducer and is fed into a computer-controller which computes the correct opening time of the weigh valve. At the correct time as determined by the computer-controller, the signal is sent to a solenoid valve which actuates and causes the weigh valve to open. The material flows through the weigh valve into a distribution hopper and ultimately into the container or system in which the material weighed is to be used. In the particular process for which the feeder was originally developed, the material flows to a dispenser where it is to be dispersed with the inert liquid carrier, or material, depending on the process. The cycle is repeated continuously resulting in the precise feed rate of a given weight of material per unit interval of time.

It is believed that the invention will be better understood from the following detailed drawings and description in which:

FIG. 2 is a partially sectioned perspective view of the weigh transducer assembly;

FIG. 3 is a sectional view taken along line 3—3 of FIG. 2;

FIG. 4 is a sectional top view taken along line 4—4 of FIG. 1;

FIG. 5 is a sectional view of the weigh valve in a partially closed position;

Figure 1:
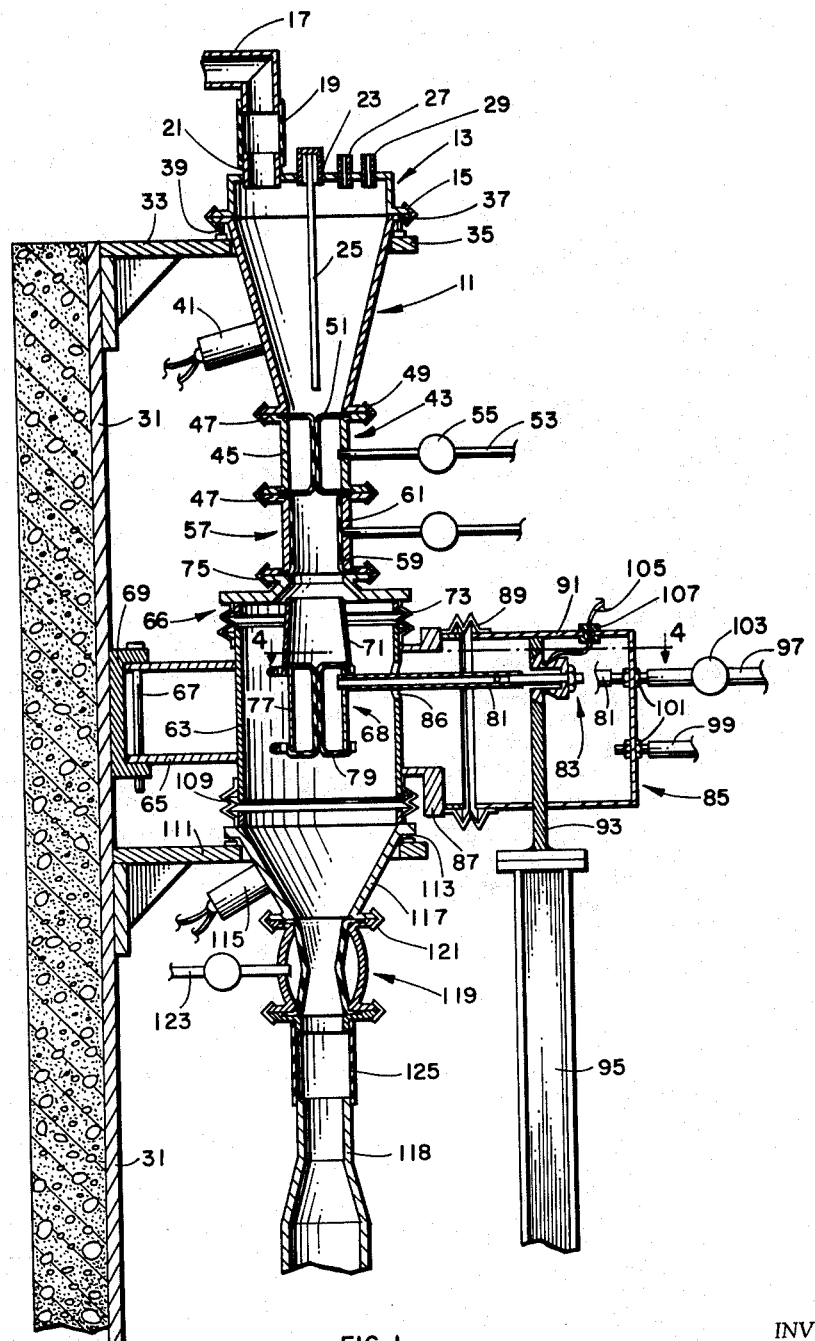
FIGURE 1 is a partially sectioned pictorial view of the solids feeder device of the invention.

The solids feeder device as seen in FIG. 1 is comprised of a hopper 11. A top cover 13 is provided for the hopper 11. V-clamps 15 serve to secure lipped portions of the hopper 11 to cover 13. Additionally, the cover 13 is provided with a plurality of openings therein through which various streams of materials can be admitted to the hopper. Through inlet line 17, the solids are directed from a bulk supply source (not shown) into the hopper. A flexible connector 19 of rubber-like material can secure the inlet line 17 to a riser portion 21 of the cover 13. Within a second opening 23 in the top 13 of the hopper, there is provided a level probe 25 which serves to indicate the solids level and control the bulk dry solids supply. Such a level probe is a conventional item and functions by supplying an electrical signal to a solenoid valve (not shown) which operates and controls the input from the dry solids bulk supply line 17. A third opening 27 in the top of the hopper serves as an inlet for water deluge in case of fires or the like. Alternatively, carbon dioxide for fire extinguishing could be admitted through this opening. A fourth and final opening 29 may be present through which nitrogen for pressurizing or blanketing the dry solids can be admitted. It should be obvious that additional apertures can be present in the top of the device for admitting other materials to the hopper, and alternatively, the apertures shown may be less in number or can be used for other purposes than disclosed.

The feed hopper 11 is suspended from a vertical wall 31 to a horizontal support structure 33. A ring 35 which is an integral part of the horizontal structure 33 completely surrounds the lip portion 37 of the hopper. Conventional flexible shock mounts 39 are disposed between the lip 37 and the ring support member 35. A controllable vibrator 41 is mounted on the outside of the hopper 11. The vibrator is actuated by a solenoid valve, not shown, controlled by a computer-controller. The computer-controller, which will be explained in further detail, controls the time of vibration and the relationship of the vibration to the feed or fill time. This is a preset value dependent upon the material being fed. The shock or vibration mounts 39 serve to isolate the feed hopper vibration from the rest of the system and to make the use of the vibrator more effective.

At the bottom of the hopper is located a main feed or fill valve 43. The valve comprises an outer cylindrical housing 45 with lip portions 47 on both ends. The lip portions are held to corresponding flanges on the feed hopper by V-band clamps 49 which permit the easy disassembly of the element. A continuous cylindrical flexible membrane 51 is held in place between the flange of the hopper and the lip portion 47 of the valve housing. Inlet line 53 having a solenoid valve 55 therein intersects the housing wall 45 and serves to admit pressurized gas between the membrane 51 and the housing wall 45 of the valve.

As shown, the valve is in a closed position, inhibiting the flow of solids. In this position, the pressurized gas is admitted between the housing 45 and the membrane, causing the membrane to expand to a closed position. Upon release of the gas the membrane returns to the walls of the housing permitting the flow of the solids. An alternative valve 57 is situated below the main feed valve which serves as a safety valve to assure stopping the solids fed into the system in case of emergency, or alternatively, to serve as a back-up for the main valve if the main valve becomes defective. The alternative valve 57 is and operates the same as the main valve 43. It is to be noted that the flexible membrane 59 of the alternative valve is shown in an open position and is in intimate contact with the outer walls 61 of the valve permitting the flow of solids. It should be readily apparent that this second valve is not necessary to the operation of the device, but provides an added safety feature. The feed valve operation will be better understood with reference to FIGS. 4 and 5, as will be further described.

A weighing assembly 68 is situated below the alternative valve 57. A main housing 63 is rigidly supported relative to the wall 31 through horizontal struts 65 which are fixedly attached to the housing. The struts 65 are secured by a pin 67 to a U-shaped receptacle 69 which is affixed to the wall 31. The top portion of the weigh assembly 66 is separated from the main housing 63 by flexible bellows 73. V-band clamps 75 affix the top portion 66 to the second valve assembly 57 to aid in the disassembly of the device. The flexible bellows 73 serve to isolate the weigh assembly from the vibrations caused by the vibrator 41 attached to the feed hopper. The bellows 73 may be constructed of rubber or any other suitable flexible material.

Within the weigh assembly situated adjacent the bottom of the valve 57 is a weigh hopper or container 71. At the bottom of the weigh hopper is a weigh or dump valve 77 having the same construction as the previously described feed valves. The flexible membrane 79 of the weigh valve is shown in the closed position which enables the solid material to be retained in the hopper 71. A gas inlet line 81, which will be further described in FIG. 4, serves to admit the gas to the valve 77 to operate the membrane and also supports the hopper 71 and valve in its relative position within the housing 63 and is a support therefor. Additionally, inlet line 81 intersects a weigh transducer assembly 83 which translates each increment of weight into a precise signal to be sent to a computer-controller. A cylindrical casing 85 surrounds the transducer assembly 83 and gas inlet 81. The casing 85 is rigidly affixed at one end 87 thereof to the wall of housing 63 about aperture 86 therein. Bellows 89 of a flexible material separate the first portion 87 of the housing from a second portion 91. The second portion 91 of the housing 85 is rigidly secured through a vertical support strut 93 which extends from a vertical beam 95. The strut 93 extends within the housing 85 and is rigidly affixed to the transducer assembly 83 and serves to support it as well as the second part 91 of the transducer housing in a fixed stable position.

Intersecting the outer wall of the second portion 91 of the housing 85 are two gas lines 97, 99 respectively. Also, the gas lines are connected to the wall of the portion 91 through A–N fittings 101 or the like. The gas line 97 after passing through the walls of the housing becomes the gas inlet line 81. Situated in the line 97 is a solenoid valve 103 serving to control the gas being admitted to the valve 77 serving to open and close it at the desired times. The second gas line 99 admits an inert gas into the housing 85. This serves to keep the pressure within the housing 85 greater than that at the weigh valve 77. By keeping the pressure higher in the area surrounding the transducer 83, any particles of solid matter that are being transported in the weigh assembly are prevented from affecting and entering the tranducer area. Additionally admitted through the walls of the housing 85 are the electrical leads 105 which direct the current from the weigh transducer assembly to the computer-controller. The leads are admitted through a sealed electrical connector, 107.

Adjacent the lower end of the weigh valve assembly is a funnel-shaped distribution hopper 117. The hopper is separated from the housing 63 for the weigh valve assembly by flexible connectors 109 which are essentially the same as those connectors 73 at the upper end of the weigh assembly. The distribution hopper 117 is supported by a horizontal support strut 111 to extend from the wall 31. The strut 111 surrounds the distribution hopper in the same manner that strut 33 surrounds the feed hopper as previously described. The distribution hopper is connected to the support strut 111 through shock mounts 113. A vibrator 115 is affixed to the outer wall of the distribution hopper and serves to vibrate the solid materials passing therethrough to facilitate in the movement. As can be seen, the enclosure 63 for the weigh valve assembly is thus isolated from the rest of the system through the flexible bellows so that vibrational forces existing in other parts of the system are not transmitted to the weigh assembly but rather absorbed in the flexible bellows. The distribution hopper 117 serves to direct and funnel the dry solids from the weigh valve to the inlet stand pipe 118. Disposed between the bottom of the distribution hopper 117 and the stand pipe 118 is dump valve assembly 119 secured by V clamps 121. The valve assembly 119 operates in the same manner as the previously described valves through an inlet of gas 123 which serves to open or close or alternatively constrict the opening therein. A flexible connector 125 can connect the valve assembly 119 to the stand pipe 118.

The weigh transducer assembly 83 is shown in particular detail in FIG. 2. However, for the understanding of the present invention, a description of the assembly is presented. The rigid vertical support 93 fixedly secures a strain fitting 127 which concentrically surrounds the gas inlet line 81.

The strain fitting 127 is comprised of two cylindrical relatively heavy portions 129 and 131 which are separated by a thin walled portion 133. The front portion 129 of the fitting is seated in the vertical support 93. The rear portion 131 of the fitting is keyed into the solid portion of the line 81. The rear end of line 81 is threaded 135 with a nut 137 tightened against the rear end of the portion 131 of the fitting securing it in place. As a result of the positioning of the fitting 127 the only contact between it and the line 81 is at the rearward portion of the fitting and line. Any movement of the arm 81 according to the weight of material in the weigh valve is transmitted through the line and is reflected in compression and tension movements of a thin wall portion 133 of the fitting. Surrounding the thin wall portion 133 of the fitting are disposed four semiconductor strain gauges 139. The arrangement of these strain gauges about the thin wall portion 133 is more clearly shown in the section of FIG. 3. As can be seen, two are placed at the uppermost portion of the thin wall portion while the remaining two are placed about the bottom portion of the wall. Thus as the weight in the weigh valve is increased, the inlet line 81 is caused to bend, forcing the upper two semiconductor strain gauges to go into a state of compression while the bottom two gauges go into a state of tension. The strain gauges are bonded to the surface of the thin wall portion 133 by epoxy material or the like. Electrical leads from the strain gauges are directed to a bridge assembly, then sent to the computer-controller, which in turn sends a signal to the weigh valve which releases the increment of material in an exact time so the precise feed rate is maintained.

FIG. 4 depicts the system admitting pneumatic pressure to the weigh valve to control its closing. A line 141 from the gas pressure tank, not shown, intersects a T-joint 143. Flexible hosing 139 serves to conduct the gas from the first T-joint 143 to a second T-joint 145 within housing 85. As can be seen, the flexible line 130 serves to direct the gas around housing 85 to avoid interference with the pressure transducer assembly 83 situated within housing 85. The line 130 intersects the gas inlet line 81 at a point between the transducer assembly 83 and the weigh valve 77, the intersection taking place within housing 85. As shown in FIG. 4, the weigh valve is in a closed position which is caused by the exertion of pressure from the gas admitted through line 81 into the housing 77. The number of folds 147 in the flexible liner 79 is dependent upon the thickness thereof. The thicker the material, the fewer number of folds. FIG. 5 discloses the valve of flexible material 79 in a partially open position which view more distinctly shows the pattern formed by the flexible material as it is forced under gas pressure to close.

Figure 6:
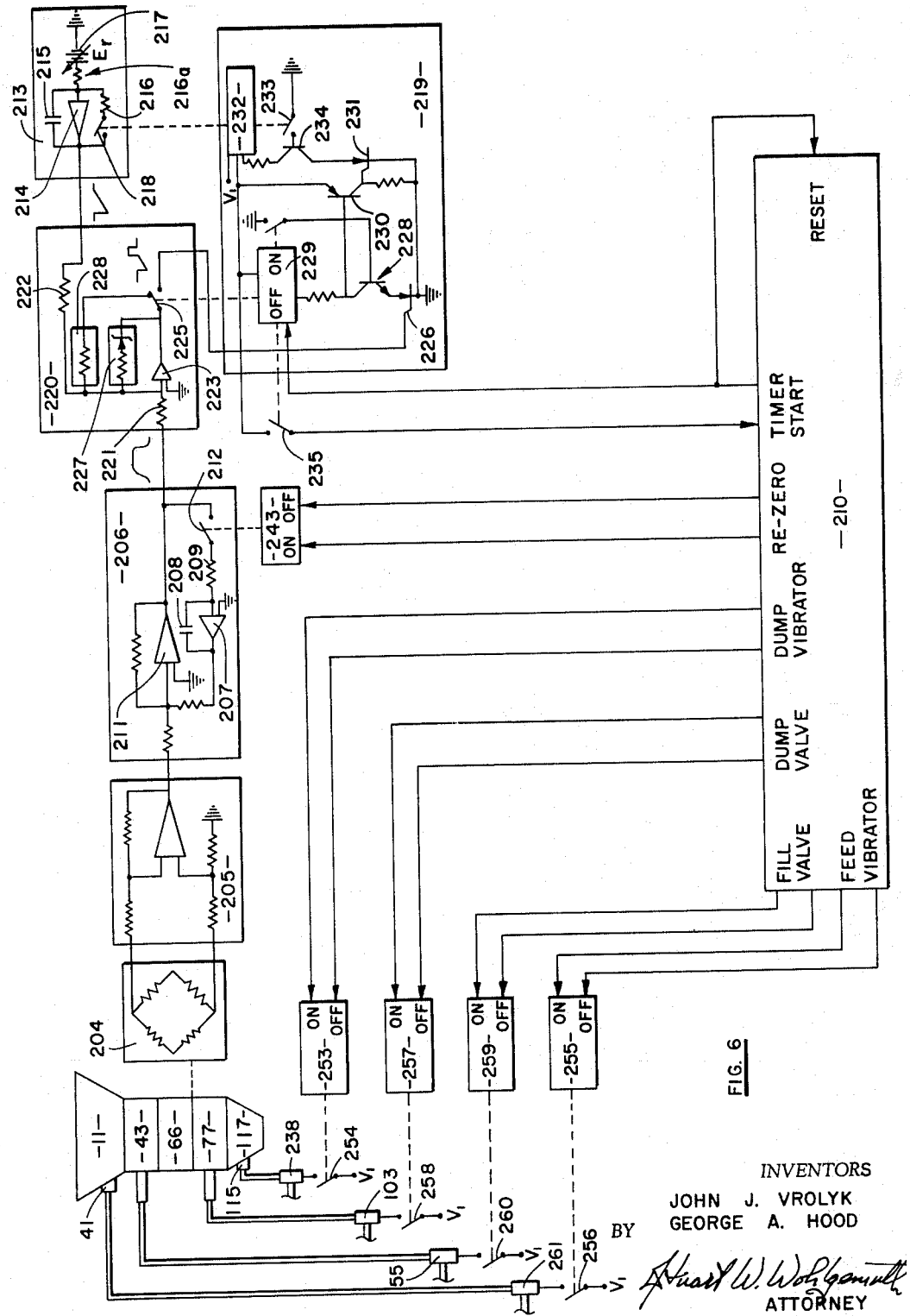
FIG. 6 is a schematic diagram of the computer-controller system utilized.

Referring now to FIG. 6 wherein it is shown one embodiment of a computer-controller system for processing increments of materials such as flour, powdered aluminum, powdered potassium chloride, coarse powdered ammonium sulfate, etc. A certain increment flows into weigh container 71 over a controlled period of time from hopper 11 through opened fill valve 43 and flows from the container through opened weigh or dump valve 77 into hopper 117.

The fill period of time is controlled by fill valve 43 which is electrically activated by a timing signal from the computer-controller. The valve, as explained, may be a flexible tube housed by a metal cylinder in such a way that when pneumatic or hydraulic pressure is applied, the flexible tube closes and when the pressure is released, the tube is opened. The pressure, in the example, is applied through the use of solenoid valve 261 which is actuated as a result of a fill signal from the computer-controller. The period of time the valve is open is a factor in controlling nominal material increment size which must be within a particular range for a precise feeding system.

After the material increment is weighed, it is dumped from the weighing container. Dumping is controlled by the second valve 77. It is activated by a dump signal generated by the computer-controller. While the fill signal remains relatively constant, as to duration and position in a material processing cycle, the dump signal is dependent upon the weight of the increment in the container at the time. The dump signal is generated in exact time proportion to the increment weight. By making the dump time proportional to the material increment weight, a given weight of material is processed over a given interval of time. In other systems, time for feeding an increment of material is fixed and not dependent on the weight of the material and control is exercised on the quantity of material delivered. The computer-controller system for processing materials weighs an increment and generates a dumping signal which is delayed in proportion to the increment weight. Processing time is, therefore, dependent on the weight of the increment. Pneumatic vibrators 41 and 115 may be turned on in accordance with the processing sequence by signals from the computer-controller to insure a steady flow of material from the feed hopper and out the dump hopper.

As indicated, the material increment in the container is weighed. The weighing is precise so that the quantity of material processed over a period of time is precisely controlled. Weighing is achieved by transducer 204 which is mechanically linked to the weigh container or hopper 71. The weight of the increment is translated into an electrical signal. In one embodiment, the transducer is comprised of strain gauges as shown and described in FIGS. 1 and 2 connected as a bridge. Under no increment weight conditions, after a dump and before a fill, the transducer or weighing signal is approximately zero. Under other conditions, the signal is proportional to the increment weight.

The computer-controller system is comprised of means responsive to the weighing signal for initiating a timing sequence for dumping and filling the weighing container.

Amplifier 205 amplifies the weighing signal for overcoming possible losses encountered in transmitting the signal from the transducer to the computer-controller system. Amplifier 205 also increases the magnitude of the signal so as to reduce anticipated system noise which might be added to the signal as it passes down the cable.

Re-zero circuit 206, which includes an amplifier, further amplifies the weigh signal. However, the weigh signal is referenced about a zero origin to compensate for material possibly remaining in the weigh container after a dump. For example, if after a dump, some material remained in the container, and no compensation was introduced, the subsequent weigh signal would indicate a larger increment of material than actually was filled into the container, and if the increment remained in the container for several dumps, the system would appear to have processed more material than it actually had. By compensating for that material or tare weight of the container, as it is often designated, each subsequently filled increment is accurately weighed and dumped so that over a period of time errors are effectively minimized. Since the material stuck or hung-up in the container was weighed with its companion material when first filled, when it subsequently drops through the container, no error is created.

Re-zeroing circuit 206, in the embodiment shown, includes amplifier 211, amplifier 207. Capacitor 208 is connected from the input to the output of amplifier 207. Resistor 209 is in series with the input of amplifier 207 and the output of amplifier 211.

Switch 212 controls the re-zeroing. When closed, immediately after a dump and before a fill, if amplifier 211 has an output signal due to material stuck in the container, it is fed back through the re-zero circuit to cancel the signal at the input of amplifier 211; thus indicating virtually zero output of amplifier 211, and therefore zero material in the container before filling with a new increment. Switch 212 is closed in response to a signal generated by sequence timer 210, described subsequently. In the FIG. 6 embodiment, capacitor 208 is charged by the output of amplifier 211 when switch 212 is closed. After the switch is open, the high impedance of the circuits prevents the level from dropping appreciably before the next re-zero or re-reference cycle.

The signal from amplifier 211 approximates the rectangular signal shown at the output thereof.

Ramp generator 213 generates an electrical signal having an approximate triangular shape as shown at the output thereof. The generator, in the exemplary embodiment, comprises amplifier 214 with capacitor 215 and resistor 216 in parallel therewith. Voltage source 217 supplies input potential to the amplifier configuration through resistor 216a. The current supplied by source 217 is constant and is pumped into capacitor 215 by amplifier 214 at a precisely constant rate, causing the voltage to increase exactly linearly as a function of time. This ramp signal begins a cycle from a zero or minimum value and increases linearly to its peak or a maximum value when switch 218 is momentarily closed, thereby discharging the capacitor and reducing the signal to its minimum value. Under normal operation and with switch 218 open, the voltage output increases linearly as a function of time, in absolute value, until switch 218 is again closed. Switch 218 is controlled by switching circuit 219, described later. The ramp signal is used as a comparison signal with the output weigh signal from amplifier 211.

Two possible means for adjusting the feed rate (i.e. weight per unit time) are by adjusting (1) the amplitude of the voltage source 217; or (2) the gain of amplifier 211. In the first, for equal increments of material, increasing the voltage, increases the slope of the ramp signal 251 which in turn decreases the period between subsequent coincidences between the ramp and input signals. In the second, for equal increments and a fixed slope for the ramp signal, decreasing the gain, again decreases the period between subsequent coincidences between the ramp and input signals.

The two signals, from amplifier 211 and ramp generator 213, are compared by the comparator circuit 220. The signals are summed algebraically across resistors 221 and 222 and the summed quantity is then amplified by amplifier 223. For example, if the amplifier 211 signal appears as a rectangular wave and the ramp generator 213 signal appears as a triangle wave, after summation and amplification with phase reversal, the comparator signal may appear as shown at the output thereof.

The comparator includes means designated as enable and disable means for placing the comparator in either an enable or a disable mode. The comparator is in the enable mode when switch 225 is closed to connect comparator 220 with switching circuit 219. Switch 225 is controlled by a signal generated by sequence timer 210.

As shown in the FIG. 6 embodiment, a silicon controlled rectifier 226 comprises the input stage of switching circuit 219 and is connected for being triggered by a positive pulse.

Figure 7:
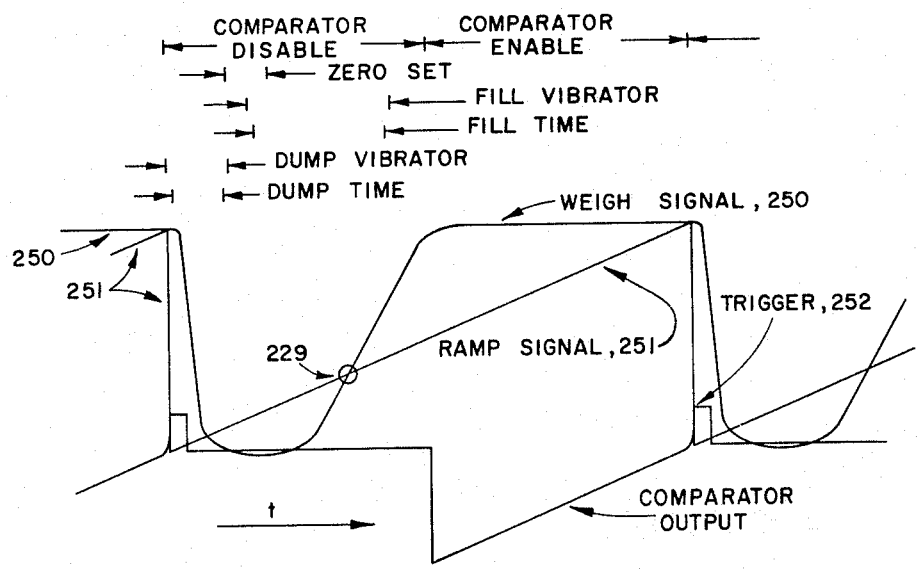
FIG. 7 is a time-voltage-function relationship diagram for the computer-controller.

During the enable mode, the comparator generates a positive pulse, as shown in FIG. 7. Therefore, in order to trigger switching circuit 219 and initiate other computer-controller operations as described later, the comparator must be in the enable mode when the positive signal is generated. Enable portion 227 cuts the signal down by feeding all but a portion back to the input. For example, if the positive pulse of no more than 6 volts peak is required as a trigger, a six volt zener diode might be used in the enable portion.

The comparator is disabled or in the disable mode when switch 225 is open. Disable portion 228 may comprise a low feedback resistor to keep the comparator output relatively low while it is disabled. As shown in FIG. 7, during the disable mode the output is approximately zero. Both modes are essential, because for the FIG. 6 embodiment, a positive pulse would be generated to trigger rectifier 226 at the first coincidence (point 229 of FIG. 7) and the switching sequence would be initiated prematurely. Therefore, the comparator is disabled until the first coincidence has been passed after which time the comparator is enabled until the second point of coincidence is passed. The second point of coincidence is dependent on the magnitude of the increment weight.

Switching circuit 219 connected to comparator 220 is actuated or triggered by the presence of the positive pulse from the comparator when it is in an enable mode. The switching circuit initiates a timing cycle by starting sequence timer 210. At the same instance it switches comparator 220 into the disable mode. Also, the ramp signal is momentarily reduced to zero by means of a signal generated by the switching circuit. For the embodiment shown, the positive pulse triggers rectifier 226 and the current actuates relay 229. The relay is connected for closing switch 225 of the comparator thereby disabling it and for switching on sequence timer 210. Transistor 230 is turned on thereby triggering rectifier 231. Current then actuates relay 232 which is connected for closing switch 218 thereby momentarily reducing the ramp to zero. Relay 232 is also connected to switch 233 so that almost instantaneously switch 233 is closed and transistor 234 is turned off. Relay 232 is deactivated, switch 218 is released and the ramp signal begins to increase.

Sequence timer 210, for the embodiment described, may be a ring counter as discussed generally in "Arithmetic Operations of Digital Computers" by R. K. Richards on pages 205–208. A sequence timer may comprise an oscillator triggered by the application of a voltage. The oscillator may initiate counting, for example, by triggering a flip-flop in the first stage of the counter. The timer may comprise a plurality of flip-flops series connected in groups of ten, with the last flip-flop in a positive group being used to trigger the first flip-flop of the next group, etc. The flip-flop combination is arranged so that each one represents an increment of time. By selectively "anding" several of the outputs of the flip-flops together, a signal comprising pulses spaced a desired time distance apart are generated. Further details are contained in the above reference.

In the FIG. 6 embodiment, switch 235 is closed by the action of relay 229 in switching circuit 219. Closing of the switch puts a potential on the oscillator (not shown) of the counter and initiates counting. Flip-flop outputs are "anded" together to achieve the eleven signal outputs designated as on and off dump vibrator, on and off dump, on and off re-zero, on and off fill vibrator, on and off fill, reset and enable.

Dump vibrator 115 is mounted outside distribution hopper 117 and is pneumatically activated by solenoid valve 238 controlled by the dump vibrator signal from timer 210. The dump vibrator signal activates signal relay 253 to close switch 254, $V_1$ energizes solenoid 238, and an air flow starts vibrator 115 vibrating. The vibrator remains on for a period of time from just after a dump to just prior to the re-zero time.

After the dump vibrator is actuated, weigh valve 77 is pneumatically opened when the solenoid valve 103 closes. Relay 257, which is turned on by the dump signal from timer 210, closes switch 258 thereby actuating valve 103 with potential $V_1$. Valve 103 permits pneumatic or hydraulic pressure to be applied for opening or closing valve 77.

After the dumping is completed, valve 77 is closed and the dump vibrator is cut off by timing signals from the sequence timer.

Relays used in connection with dumping, filling, etc. may be the latching type requiring a second signal for releasing the switch. Therefore, relay 259 has an on and off input signal. One signal closes the relay switch and a second signal opens the switch. During the "on" period, switch 258 is closed and a pneumatic or hydraulic pressure is applied to weigh valve 77. During the "off" period, switch 258 is opened and the pressure removed.

Immediately following a dump, a re-zero signal is generated to actuate relay 243 for closing switch 212. If there is tare weight it is compensated for by the re-zero circuit. After a selected interval of time, a re-zero "off" signal is generated by timer 210, relay 243 is deactuated and switch 212 is opened to permit normal operation of amplifier 211.

After re-zeroing, a new increment of material is introduced into the weigh container. Feed vibrator 41 is mounted outside hopper 11 and is pneumatically activated by solenoid valve 261 controlled by the feed vibrator signal from timer 210. The feed vibrator signal activates signal relay 255 to close switch 256, $V_1$ energizes solenoid 261, and an air flow starts vibrator 41 vibrating. The vibrator remains on until after the fill is completed, at which time a fill vibrator "off" signal turns relay 255 off.

In some uses, specifically, when certain kinds of material are being processed, the vibrators may be eliminated altogether.

Filling is begun by opening fill valve 43. A fill valve "open" signal is generated by the sequence timer and relay 259 closes switch 260 thereby placing voltage $V_1$ on solenoid 55 and pneumatically opening valve 43. After a desired period of time sufficient to place a controlled quantity into weigh container 71, a second signal, fill valve "close" is generated to open switch 260 thereby closing valve 43.

In a preceding portion of the cycle, the comparator was placed in the disable mode by the action of relay 229. Following a fill interval, however, it is necessary to enable the comparator. Therefore, an enable signal is generated by the timer which turns relay 229 off, thereby opening transistor switch 28 and closing switch 225. Transistor switch 228 is turned off by closing switch 229. Rectifier 226 is turned off and is in a state to be triggered by a positive pulse from the comparator.

The enable "on" signal also serves as a timer reset signal. The timer is reset to zero before each processing cycle of a material increment so that the timing signals are generated at the same time throughout a material processing operation. Resetting means are well known in the art and are not discussed at length herein. For example, when resetting a time using flip-flops in a ring counter configuration, flip-flops are placed in a zero condition.

A brief description of system operation is taken in connection with FIG. 7. An increment of nominal material weight is measured out by volume according to the period the fill valve is open. It is weighed in the container and an analog voltage 250 proportional to the weight is generated by transducer 204 and is amplified. The voltage is then compared with a second analog voltage 251 which is a linear function of time, and at the instance of selected coincidence, a trigger signal 252 is generated which causes the increment of material to be dumped. Trigger signal 252 initiates the computer sequence of disabling the comparator to prevent additional trigger signals from being generated when the ramp signal 251 exceeds the weighing signal 250. After the comparator is disabled, the dump vibrator is turned on and the material in the weighing hopper is dumped. Subsequently, a compensating charge is placed on comparator 208 to compensate for any signal developed by material remaining in the weighing hopper at the end of the dump period. After the zero set or compensation period has ended, and prior to the time the comparator is enabled, the weighing hopper is filled. The comparator is again enabled after the weighing signal has achieved its approximate maximum amplitude. When the ramp signal exceeds the weighing signal another trigger pulse is generated. As shown in FIG. 7, by increasing the slope of the ramp signal 251 the trigger 252 may be made to occur at any time during the period when the weighing signal 250 has left its approximate maximum amplitude.

The trigger signal 252 initiates the start of each cycle of material measurement. The signal is used as an input to the switching circuit which by use of relays disables the comparator, resets the ramp voltage 251, and starts the sequence timer.

The ramp voltage increases at its set rate until it barely exceeds the weigh signal 250 at which time the trigger signal 252 occurs and a new measurement period is in effect. The sequence timer then operates the dump valve, delivering the previously weighed material increment.

Upon completion of the dump, the weigh signal is re-zeroed by activation of switch 209 in the re-zero circuit. Re-zeroing adjusts for material hang-up in the weigh container, and for any drift in transducer 204, and amplifiers 205 and 206. In effect, the amplifier 211 is biased by amplifier 207 an amount proportional to the material remaining in the container. The bias reduces the amplitude of the signal of the succeeding increment so that it represents only the increment filled into the container.

The comparator is enabled after the first coincidence between the new weigh signal and the ramp signal and the sequence timer is reset to zero. Upon receipt of a trigger signal from the comparator the cycle is repeated.

Although the invention has been described and illustrated in detail, it is to be understood that the same is by way of illustration and example only, and is not to be taken by way of limitation; the spirit and scope of this invention being limited only by the terms of the appended claims.

We claim:

1. A device for feeding materials comprising:
   a feed hopper having a valve affixed to the bottom outlet thereof,
   a first housing fixedly secured below said feed hopper,
   a weigh hopper disposed in said housing, said hopper having a valve at the bottom thereof,
   a distribution hopper disposed below said first housing,
   a second housing fixedly secured horizontally adjacent said first housing,
   flexible means separating said first housing from said feed hopper, said second housing and said distribution hopper,
   means for supporting said weigh hopper extending from said first to said second housing and being rigidly affixed to said second housing,
   means for vibrating said feed and distribution hoppers,
   means for admitting an inert gas to said second housing,
   means connected to said hopper support means for weighing an increment of material,
   and means for opening and closing said valves responsive to said weighing means.

2. A system for continuously filling materials into and dumping materials from a hopper comprising,
   weighing means for generating a first signal indicating the weight of material in a hopper, compensating means for subtracting from said first signal an amount equivalent to the weight of any material remaining in the hopper after the material is dumped therefrom, means for generating a control signal, means for comparing the control signal with the compensated first signal including means for generating a trigger signal at a selected coincidence of the signals, means responsive to said trigger signal for dumping said material from the hopper and for filling material into said hopper.

3. A continuous feeder system for processing a material through a weighing hopper by filling and dumping the hopper comprising, signal means for generating a first signal indicating the weight of a material inside the hopper, means for offsetting said signal by an amount equivalent by the weight of any material in the hopper prior to a filling, means for generating a control signal, comparison means for comparing said control signal with said first signal after offsetting and for generating a trigger signal at a coincidence of the signals, means actuated by said trigger signal for dumping the material from said hopper and for filling material into said hopper.

References Cited by the Examiner

UNITED STATES PATENTS

| | | | |
|---|---|---|---|
| 2,720,375 | 10/1955 | Carter | 177—1 |
| 2,925,983 | 2/1960 | Kennaway et al. | 177—68 |
| 2,954,202 | 9/1960 | Bale | 177—122 X |
| 3,024,857 | 3/1962 | Charcuset et al. | 177—71 |
| 3,077,940 | 2/1963 | Blodgett et al. | 177—165 |
| 3,089,555 | 5/1963 | Harris | 177—81 |
| 3,125,176 | 3/1964 | Bale | 177—80 |
| 3,133,607 | 5/1964 | Gardner et al. | 177—108 |
| 3,160,811 | 12/1964 | Muniz et al. | 177—210 X |

LOUIS J. CAPOZI, *Primary Examiner.*

STEPHEN J. TOMSKY, LEO SMILOW, *Examiners.*